(12) United States Patent
Zhang

(10) Patent No.: US 11,419,003 B2
(45) Date of Patent: Aug. 16, 2022

(54) COMMUNICATING SCHEDULING REQUESTS IN A WIRELESS NETWORK

(71) Applicant: InterDigital Technology Corporation, Wilmington, DE (US)

(72) Inventor: Guodong Zhang, Woodbury, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 16/811,560

(22) Filed: Mar. 6, 2020

(65) Prior Publication Data

US 2020/0213898 A1   Jul. 2, 2020

Related U.S. Application Data

(63) Continuation of application No. 15/703,424, filed on Sep. 13, 2017, now Pat. No. 10,588,046, which is a
(Continued)

(51) Int. Cl.
| | |
|---|---|
| *H04W 28/02* | (2009.01) |
| *H04L 47/12* | (2022.01) |
| *H04L 47/26* | (2022.01) |
| *H04L 47/283* | (2022.01) |
| *H04W 72/12* | (2009.01) |

(Continued)

(52) U.S. Cl.
CPC ......... *H04W 28/0278* (2013.01); *H04L 47/12* (2013.01); *H04L 47/14* (2013.01); *H04L 47/26* (2013.01); *H04L 47/283* (2013.01); *H04W 72/04* (2013.01); *H04W 72/1284* (2013.01); *H04W 74/004* (2013.01); *H04W 28/12* (2013.01); *H04W 28/14* (2013.01); *H04W 28/20* (2013.01);
(Continued)

(58) Field of Classification Search
None
See application file for complete search history.

(56) References Cited

U.S. PATENT DOCUMENTS

| | | | |
|---|---|---|---|
| 6,532,225 B1 | 3/2003 | Chang et al. | |
| 7,423,997 B2 | 9/2008 | Kuchibhotla et al. | |

(Continued)

FOREIGN PATENT DOCUMENTS

| | | | |
|---|---|---|---|
| EP | 1487156 | 12/2004 | |
| WO | 02/05453 | 1/2002 | |
| WO | WO-0205453 A2 * | 1/2002 | ........... H04L 5/0064 |

OTHER PUBLICATIONS

Nokia, "Content of Scheduling Information," 3GPP TSG-RAN WG2 Meeting #46, R2-050330 (Feb. 14-18, 2005).
(Continued)

*Primary Examiner* — Adnan Baig
(74) *Attorney, Agent, or Firm* — Volpe Koenig

(57) ABSTRACT

A wireless transmit/receive unit (WTRU) may generate, on a condition that a scheduling request and an acknowledgement/negative acknowledgement (ACK/NACK) or channel quality information (CQI) are to be transmitted, a message having the scheduling request and the ACK/NACK or the CQI. The message may be transmitted over a physical uplink control channel. The WTRU may determine whether scheduling request information, including buffer status, is to be transmitted. The scheduling request information may be transmitted as in-band information.

16 Claims, 2 Drawing Sheets

Related U.S. Application Data continuation of application No. 13/932,818, filed on Jul. 1, 2013, now Pat. No. 9,794,824, which is a continuation of application No. 11/677,091, filed on Feb. 21, 2007, now Pat. No. 8,477,695.

(60) Provisional application No. 60/776,345, filed on Feb. 24, 2006.

(51) Int. Cl.
| | | |
|---|---|---|
| *H04W 74/00* | (2009.01) | |
| *H04W 72/04* | (2009.01) | |
| *H04W 28/12* | (2009.01) | |
| *H04W 28/14* | (2009.01) | |
| *H04W 28/20* | (2009.01) | |
| *H04W 74/08* | (2009.01) | |

(52) U.S. Cl.
CPC .... *H04W 72/1268* (2013.01); *H04W 74/0833* (2013.01)

(56) References Cited

U.S. PATENT DOCUMENTS

| | | |
|---|---|---|
| 7,457,588 B2 | 11/2008 | Love et al. |
| 7,486,954 B2 | 2/2009 | Lee et al. |
| 8,488,457 B2 | 7/2013 | Zhang et al. |
| 2005/0063331 A1* | 3/2005 | Kim .................. H04W 52/0235 370/328 |
| 2005/0259662 A1 | 11/2005 | Kim et al. |
| 2006/0133322 A1 | 6/2006 | Vannithamby et al. |
| 2006/0133455 A1* | 6/2006 | Agrawal ............. H04L 27/0008 375/147 |
| 2006/0223449 A1* | 10/2006 | Sampath ............... H04L 1/0028 455/69 |
| 2006/0251031 A1 | 11/2006 | Anderson et al. |
| 2008/0254804 A1 | 10/2008 | Lohr et al. |
| 2009/0034455 A1 | 2/2009 | Lee et al. |

OTHER PUBLICATIONS

Nortel Networks, "E-UTRA RRC and MAC protocol states," 3GPP TSG-RAN WG2 Meeting #48bis, R2-052349 (Oct. 10-14, 2005).

Third Generation Partnership Project, "Technical Specification Group Radio Access Network; Enhanced uplink; Overall description; Stage 2 (Release 7)," 3GPP TS 25.319 V7.1.0 (Sep. 2006).

Third Generation Partnership Project, "Technical Specification Group Radio Access Network; Physical Channels and Modulation (Release 8)," 3GPP TS 36.211 V0.3.1 (Feb. 2007).

Third Generation Partnership Project, "Technical Specification Group Radio Access Network; Physical layer procedures (Release 8)," 3GPP TS 36.213 V0.2.1 (Oct. 2006).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V0.5.0 (Feb. 2007).

* cited by examiner

COMMUNICATING SCHEDULING REQUESTS IN A WIRELESS NETWORK

CROSS REFERENCE TO RELATED APPLICATIONS

This application is a continuation of U.S. patent application Ser. No. 15/703,424 filed Sep. 13, 2017, which is a continuation of U.S. patent application Ser. No. 13/932,818, filed Jul. 1, 2013, now U.S. Pat. No. 9,794,824, which is a continuation of U.S. patent application Ser. No. 11/677,091, filed Feb. 21, 2007, now U.S. Pat. No. 8,477,695, that issued on Jul. 2, 2013, and claims the benefit of U.S. provisional application 60/776,345 filed on Feb. 24, 2006, which are incorporated by reference as if fully set forth.

FIELD OF INVENTION

The present invention is related to wireless communication systems. More particularly, the present invention is related to an uplink (UL) scheduling request (SR) selection mechanism for Internet Protocol (IP)-based wireless communication systems, such as an evolved universal terrestrial radio access (E-UTRA) system.

BACKGROUND

In order to keep the technology competitive for ten years and beyond, both Third Generation Partnership Project (3GPP) and 3GPP2 are considering long term evolution (LTE), in which evolution of radio interface and network architecture are necessary.

In wideband code division multiple access (WCDMA) high speed uplink packet access (HSUPA), (Release 6), dedicated control channel, (or prescheduled grant for control), is used. Due to the IP-based nature of E-UTRA, no dedicated control channel may be maintained for the uplink. The scheduling request mechanism needs to be designed properly to minimize scheduling overhead without much degradation of the performance, (such as delay).

SUMMARY

The present invention is related to a wireless communication system including a wireless transmit/receive unit (WTRU) and a Node-B. An uplink scheduling request is transmitted by the WTRU to the Node-B when the WTRU has buffered (user) data to transmit to the Node-B, but needs to have a scheduling grant for uplink data transmission. The WTRU determines whether to transmit to the Node-B a short-version uplink scheduling request or a full-version uplink scheduling request, whereby the short-version uplink scheduling request uses less channel resources than the full-version uplink scheduling request by omitting information pertaining to WTRU status parameters. The wireless communication system may be an IP-based wireless communication system, such as an E-UTRA system. The short-version uplink scheduling request is a one-bit indicator or a multi-bit indicator that indicates an amount of scheduling grants or resources requested. The full-version uplink scheduling request includes at least one of a WTRU buffer status and a WTRU link budget.

If the WTRU's current scheduling grant is not sufficient to complete the current transmission of buffered data by a predefined delay, and if a sufficient scheduling grant will be provided after the WTRU transmits a predetermined number of short-version uplink scheduling requests to the Node-B, the WTRU may transmit a short-version uplink scheduling request to the Node-B as in-band signaling.

If the WTRU's current scheduling grant is not sufficient to complete the current transmission of buffered data by a predefined delay, and if a sufficient scheduling grant will not be provided after sending a predetermined number of short-version uplink scheduling requests to the Node-B, the WTRU may transmit a full-version uplink scheduling request to the Node-B as in-band signaling.

The predetermined number of short-version uplink scheduling requests may be equal to one.

The WTRU may transmit the full-version uplink scheduling request to the Node-B when at least a predetermined number of sub-frames elapsed since the last time a full-version uplink scheduling request was transmitted and the WTRU has a scheduling grant.

The WTRU may transmit the short-version uplink scheduling request to the Node-B as layer 1 (L1)/layer 2 (L2) control signaling or higher layer signaling over a contention-based uplink channel if the WTRU is currently in an initial power up mode.

The WTRU may transmit the short-version uplink scheduling request to the Node-B as L1/L2 control signaling or higher layer signaling over a contention-based uplink channel if the WTRU has been inactive for a predetermined period of time so that the WTRU is not time synchronized with the Node-B in the uplink.

The WTRU may transmit the short-version uplink scheduling request to the Node-B as L1/L2 control signaling or higher layer signaling over a contention-based uplink channel or a low-rate dedicated channel, (i.e., scheduled channel), if the WTRU is lacking a scheduling grant but still remains time synchronized with the Node-B in the uplink.

The WTRU may transmit a short-version uplink scheduling request to the Node-B when the WTRU's uplink scheduling request is to be attached to uplink acknowledgement (ACK)/negative acknowledgement (NACK) bits, channel quality indicator (CQI) bits, or both, that are transmitted in a current transmission time interval (TTI)/sub-frame.

The WTRU may transmit the short-version, (or full-version), uplink scheduling request to the Node-B as L1/L2 control signaling or higher layer signaling over an uplink shared control channel.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

Figure 1:
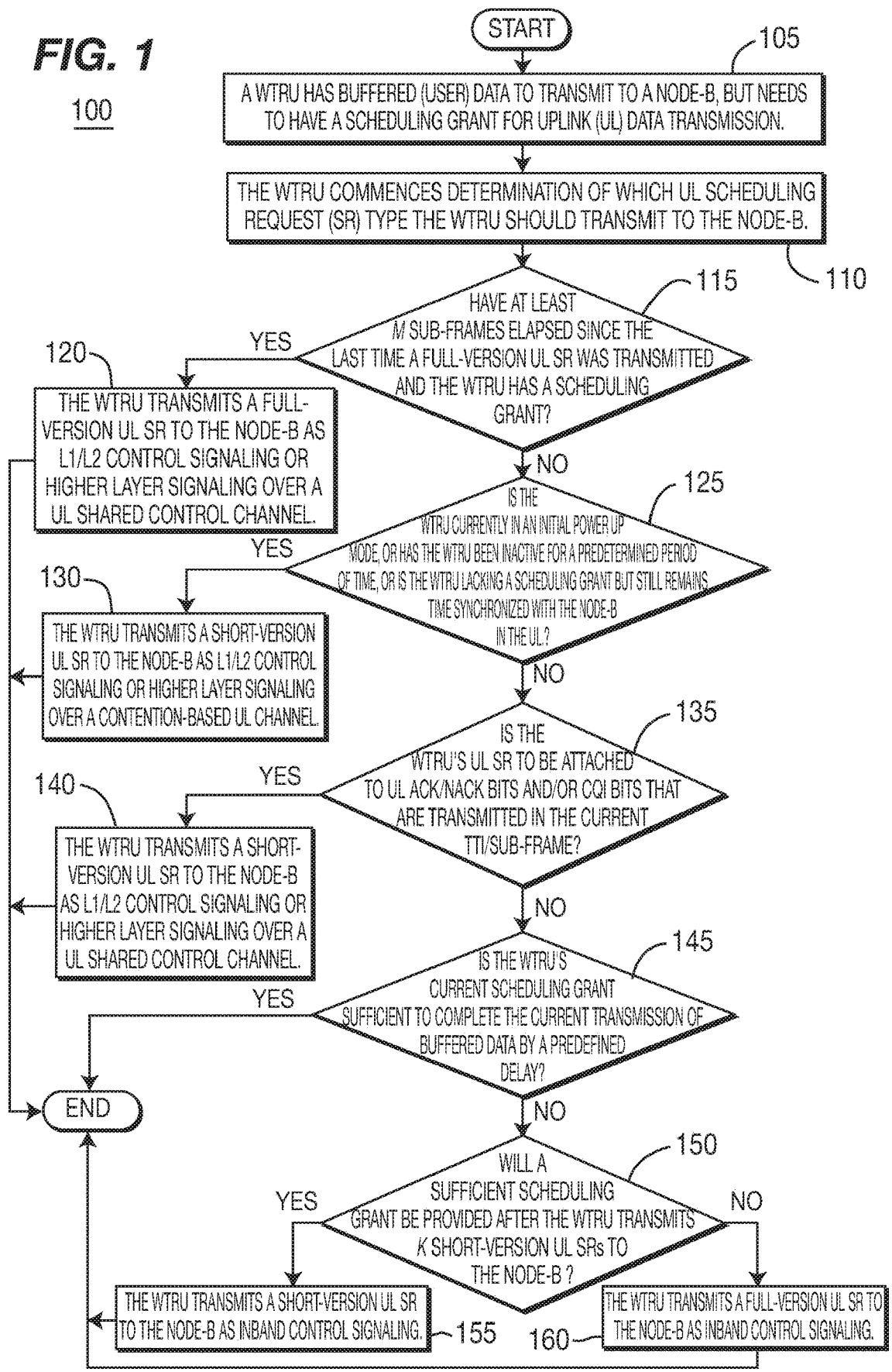
FIG. 1 is a flow diagram of an exemplary uplink scheduling request process in accordance with the present invention.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment.

When referred to hereafter, the terminology "Node-B" includes but is not limited to a base station, a site controller, an access point (AP), or any other type of interfacing device capable of operating in a wireless environment.

The present invention efficiently combines the usage of the short-version and full-version scheduling requests for the uplink of E-UTRA. A short-version uplink scheduling request includes a very small amount of information to indicate to the Node-B that either of the following events occurs: (1) that the WTRU has data to transmit, but the WTRU has no uplink scheduling grant, or (2) that the current scheduling grant for the WTRU is not sufficient to complete the transmission of the data in the WTRU buffer by a predefined delay.

A short-version uplink scheduling request may simply be a one-bit indicator, or it may contain several bits to better indicate the amount of extra scheduling grants or resources requested.

Upon receiving the short-version uplink scheduling request, the Node-B preferably allocates or increases a scheduling grant or resources for the WTRU if there are available resources. If the WTRU has no current scheduling grant, a predetermined amount of scheduling grant is allocated to the WTRU based on system parameters, including but not limited to the cell load. If the WTRU has a current scheduling grant, the Node-B increases the scheduling grant by a predetermined amount or a predetermined ratio. The predetermined amount or ratio preferably depends on system parameters, including but not limited to the cell load.

A full-version uplink scheduling request includes detailed information about the WTRU status. The information may include, but is not limited to, a WTRU buffer status, (e.g., amount of data and priorities information) and/or WTRU link budget information, (e.g., WTRU power headroom).

Upon receiving the full-version uplink scheduling request, the Node-B obtains comprehensive information about WTRU status. If there are resources available, the Node-B allocates or increases an appropriate amount of scheduling grant or resources for the WTRU to accommodate the quality of service (QoS) requirements of the WTRU, (e.g., delay), given the current status of the WTRU, such as the amount of data in the buffer, associated priorities, and link budget.

When WTRU has data to transmit, the WTRU determines whether to send a scheduling request to the Node-B, (e.g., when there is buffered data available for uplink transmission to the Node-B). If so, the WTRU determines whether to transmit to the Node-B a short-version uplink scheduling request or a full-version uplink scheduling request.

In accordance with the present invention, there are various scenarios whereby a short-version uplink scheduling request is preferably transmitted by the WTRU, including but not limited to the following scenarios.

A first scenario for when a short-version uplink scheduling request is preferred is when the WTRU just powers up or has been inactive for a period of time. That is, the WTRU has no uplink scheduling grant and no current uplink shared channel. In this case, the scheduling request is transmitted as L1/L2 control signaling or higher layer signaling over a contention-based uplink channel. The short-version uplink scheduling request, being of small size, is compatible with the very limited amount of control information capable of being transmitted over a contention-based channel, such as a non-synchronized or synchronized random access channel (RACH).

A second scenario for when a short-version uplink scheduling request is preferred is when the WTRU's scheduling request is attached to uplink ACK/NACK bits, CQI bits, or both, that are transmitted on an uplink shared control channel in the current TTI/sub-frame. In this scenario, where it has been established that the scheduling request is transmitted in such a manner, the WTRU is aware that the CQI channel or the ACK/NACK channel is to be transmitted in the current sub-frame or TTI. The WTRU is also aware that there is an uplink shared control channel available for its transmission in the current TTI/sub-frame. In this case, the scheduling request is transmitted as L1/L2 control signaling over uplink shared control channel. Here, the short-version uplink scheduling request is compatible with the reasonably small amount of control information that is attached to uplink ACK/NACK and/or CQI since these fields need to be reserved or configured in advance. Otherwise, when a full-version uplink scheduling request is transmitted, the amount of wasted resources will be significant when the full-version uplink scheduling request is not attached to an uplink ACK/NACK and/or CQI.

A third scenario for when a short-version uplink scheduling request is preferred is when the WTRU's current scheduling grant is not enough to complete the transmission of the data in the WTRU buffer by a predefined delay, and the WTRU expects that a sufficient scheduling grant will be provided, (if the resources are available), responsive to K short-version uplink scheduling requests, where K is preferably a small number, (e.g., K=1). This depends on the scheduling algorithm in the Node-B. In this scenario, a predefined delay is associated with a required QoS delay requirement of a particular service. For example, if it is a voice service, a typical predefined delay is around 20-40 msec. As another example, a best effort service such as web-browsing may have a predefined delay in the range of several hundreds of milliseconds to several seconds. The delay is measured from the time data is received at the WTRU buffer from higher layers. In this scenario, the short-version uplink scheduling request is transmitted as in-band control signaling.

In accordance with the present invention, there are various scenarios for which a full-version uplink scheduling request is preferably transmitted by the WTRU, including but not limited to the following scenarios.

A first scenario for when a full-version uplink scheduling request is preferred is when the WTRU's current scheduling grant is not enough to complete the transmission of buffered data by a predefined delay, and the WTRU expects that a sufficient scheduling grant will not be provided, (even if the resources are available), after sending a small predetermined number, say k, of short-version uplink scheduling requests. For example, the value of K may be one. This depends on the scheduling algorithm in the Node-B. In order to reduce the delay to obtain sufficient uplink scheduling grant, the WTRU sends the full-version uplink scheduling request to provide a comprehensive status update to the Node-B with the minimum delay. In this scenario, the full-version uplink scheduling request is transmitted as in-band control signaling.

A second scenario for when a full-version uplink scheduling request is preferred is when M sub-frames have elapsed since the last time a full-version uplink scheduling request was transmitted although the WTRU has a current scheduling grant, where the value of M is a design parameter. This ensures that the Node-B at least periodically obtains comprehensive status information of the WTRU pertaining to uplink scheduling.

According to the preferred embodiment of the present invention, the selection between a short-version uplink scheduling request and a full-version uplink scheduling request is made with a priority given to the short-version, such that the full-version uplink scheduling requests are transmitted substantially less frequently than short-version uplink scheduling requests. This reduces the signaling overhead for uplink scheduling requests without significant degradation of performance.

FIG. 1 is a flow diagram of an exemplary uplink scheduling request process 100 including steps 105, 110, 115, 120, 125, 130, 135, 140, 145, 150, 155 and 160 in accordance with the present invention. While a particular sequence of method steps is shown for the process 100 as an example, any alternative method step sequence may be performed. For example, steps 145, 150 and either one of steps 155 and 160 may be performed before any one of steps 115, 125 and 135. In another example, step 135 may be performed before step 115 and/or step 125. In yet another example, steps 115 and 120, or steps 125 and 130, or steps 135 and 140, or steps 145, 150, 155 and 160, or steps 115, 120, 125, 130, 135 and 140 may be removed from the process 100.

Referring to FIG. 1, the WTRU has buffered (user) data to transmit to a Node-B (step 105), but needs to have a scheduling grant for uplink data transmission. The WTRU then commences determining which uplink scheduling request type the WTRU should transmit to the Node-B (step 110). In this example, the first condition to examine is to determine whether at least M sub-frames have elapsed since the last time a full-version uplink scheduling request was transmitted and the WTRU has a scheduling grant (step 115), thus ensuring a minimum periodic full-version scheduling request. If at least M sub-frames have elapsed since the last time a full-version uplink scheduling request was transmitted, then the WTRU transmits a full-version uplink scheduling request to the Node-B as L1/L2 control signaling or higher layer signaling over an uplink shared control channel (step 120). If it is determined at step 115 that less than M sub-frames have elapsed, the WTRU determines whether it is currently in an initial power up mode, or whether the WTRU has been inactive for a predetermined period of time, or whether the WTRU is lacking a scheduling grant but still remains time synchronized with the Node-B in the uplink, (i.e., scheduled uplink shared channel for transmission) (step 125).

If the decision at step 125 is positive, then the WTRU transmits a short-version uplink scheduling request to the Node-B as L1/L2 control signaling or higher layer signaling over a contention-based uplink channel (step 130). Alternatively, at step 130, the short-version uplink scheduling request can be sent over a low-rate dedicated channel instead of a contention-based uplink channel for the scenario where the WTRU is lacking a scheduling grant but still remains time synchronized with the Node-B in the uplink.

If the decision at step 125 is negative, the WTRU determines if its uplink scheduling request is to be attached to uplink ACK/NACK bits and/or CQI bits that are transmitted in the current TTI/sub-frame (step 135). If so, then the WTRU transmits a short-version uplink scheduling request to the Node-B as L1/L2 control signaling or higher layer signaling over an uplink shared control channel (step 140). If not, the WTRU determines whether the WTRU's current scheduling grant is sufficient to complete the current transmission of buffered data by a predefined delay (step 145). If the WTRU's current scheduling grant is sufficient, the procedure 100 ends, since there is no need for additional scheduling grant and thus no need for an uplink scheduling request. If the WTRU's current scheduling grant is not sufficient, then the WTRU determines whether a sufficient scheduling grant will be provided after the WTRU transmits K short-version uplink scheduling requests to the Node-B (step 150). If K short-version scheduling requests will result in a sufficient scheduling grant being allocated from the Node-B, then the WTRU transmits a short-version uplink scheduling request as in-band control signaling (step 155). Otherwise, the WTRU transmits a full-version uplink scheduling request as in-band control signaling (step 160).

Figure 2:
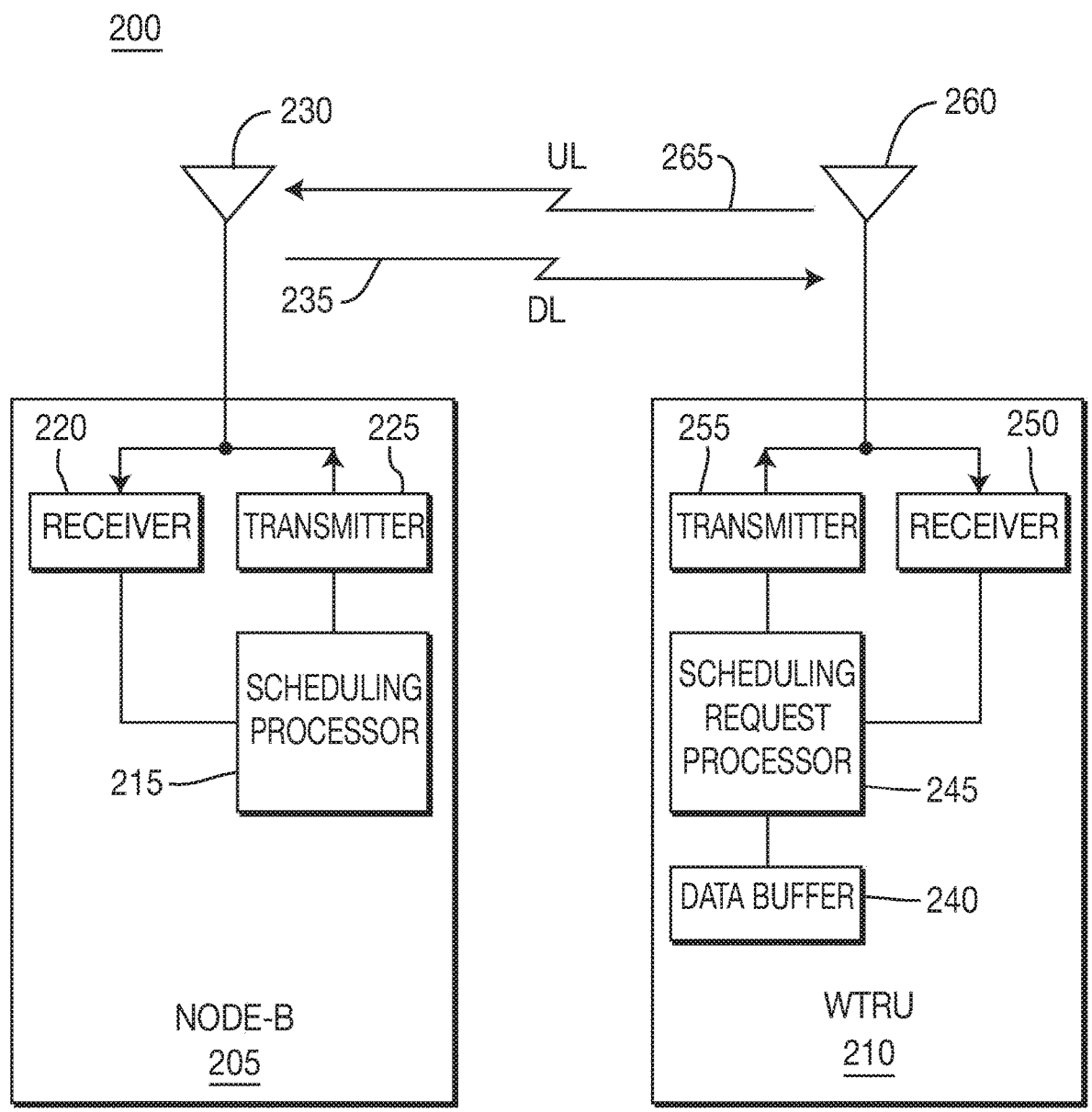
FIG. 2 is a block diagram of a wireless communication system in which the uplink scheduling request process of FIG. 1 is implemented.

FIG. 2 is a block diagram of a wireless communication system 200 in which the uplink scheduling request process of FIG. 1 is implemented. The wireless communication system 200 includes a Node-B 205 and a WTRU 210.

The Node-B 205 includes a scheduling processor 215, a receiver 220, a transmitter 225 and at least one antenna 230. The scheduling processor 215 is in communication with the receiver 220 and the transmitter 225. The antenna 230 is also in communication with the receiver 220 and the transmitter 225. The transmitter 225 is configured to transmit, via the antenna 230, a scheduling grant to the WTRU 210 over a downlink (DL) channel 235.

The WTRU 210 includes a data buffer 240, a scheduling request processor 245, a receiver 250, a transmitter 255 and at least one antenna 260. The scheduling request processor 245 is in communication with the data buffer 240, the receiver 250 and the transmitter 255. The antenna 260 is also in communication with the receiver 250 and the transmitter 255. The transmitter 255 is configured to transmit, via the antenna 260, an uplink scheduling request to the Node-B 205 over an uplink channel 265 when the WTRU 210 has data in the buffer 240 to transmit in an uplink transmission to the Node-B 205. The scheduling request processor 245 is configured to determine which type of uplink scheduling request should be sent to the Node-B 205 over the uplink channel 265 when there is buffered data in the data buffer 240 waiting to be transmitted in an uplink transmission to the Node-B 205 according to the conditional steps of the procedure 100 described above.

The receiver 220 in the Node-B 205 is configured to receive, via the antenna 230, the uplink scheduling request transmitted by the WTRU 210 over the uplink channel 265. The receiver 250 in the WTRU 210 is configured to receive, via the antenna 260, the scheduling grant transmitted by the Node-B 205 over the downlink channel 235.

Although the features and elements of the present invention are described in the preferred embodiments in particular combinations, each feature or element can be used alone without the other features and elements of the preferred embodiments or in various combinations with or without other features and elements of the present invention. The method flow chart provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit/receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

The present invention may be implemented as a wireless transmit/receive unit (WTRU), which includes but is not limited to a user equipment, mobile station, fixed or mobile subscriber unit, pager, or any other type of device capable of operating in a wireless environment. The present invention may also be implemented as a system of such a WTRU with at least one base station or Node-B. The present invention implementation is applicable to the physical layer, and by way of example, may be in the form of a digital signal processor, software or hardware.

What is claimed is:

1. A wireless transmit/receive unit (WTRU) comprising:
    a transmitter; and
    a processor;
    the processor is configured to determine that acknowledgement/negative acknowledgement (ACK/NACK) information and channel quality information (CQI) are to be transmitted in a physical uplink control channel transmission;
    the processor is further configured to determine that a scheduling request is to be transmitted;
    the transmitter is configured to transmit a message in a physical uplink control channel transmission in response to the determination that ACK/NACK information and CQI are to be transmitted in a physical uplink control channel transmission and in response to the determination that the scheduling request is to be transmitted, wherein, based on an amount of information that the message is capable of carrying, the transmitted message includes the scheduling request, the ACK/NACK information, and at least a portion of the CQI;
    the processor is further configured to determine that scheduling request information, including information indicating information indicating a buffer status, is to be transmitted; and
    the transmitter is further configured to transmit, in a physical uplink shared channel transmission, the scheduling request information including the information indicating the buffer status as in-band information.

2. The WTRU of claim 1, wherein the scheduling request is needed for transmission of buffered data before a predetermined delay.

3. The WTRU of claim 1, wherein the message is transmitted in a sub-frame as L1 or L2 control information.

4. The WTRU of claim 1 wherein the message is transmitted on a condition that a scheduling grant is insufficient for buffered data.

5. The WTRU of claim 1, wherein status information or quality of service (QoS) requirements of the WTRU are transmitted along with the information indicating the buffer status.

6. The WTRU of claim 1, wherein the WTRU utilizes Long-Term Evolution (LTE) transmissions.

7. The WTRU of claim 1, wherein the scheduling request is prioritized over the information indicating the buffer status.

8. The WTRU of claim 1, wherein the processor is further configured to send, after a predetermined number of sub-frames after transmission of the message, the information indicating the buffer status.

9. A method performed by a wireless transmit/receive unit (WTRU), the method comprising:
    determining that acknowledgement/negative acknowledgement (ACK/NACK) information and channel quality information (CQI) are to be transmitted in a physical uplink control channel transmission;
    determining that a scheduling request is to be transmitted;
    generating a message, the message comprising, based on an amount of information that the message is capable of carrying, the scheduling request and at least a portion of the ACK/NACK information and a portion of the CQI;
    transmitting a message in a physical uplink control channel transmission, in response to the determination that ACK/NACK information and CQI are to be transmitted in a physical uplink control channel transmission and in response to the determination that the scheduling request is to be transmitted, wherein based on an amount of information that the message is capable of carrying, the transmitted message includes the scheduling request, the ACK/NACK information, and at least a portion of the CQI;
    determining that scheduling request information, including information indicating a buffer status, is to be transmitted; and
    transmitting, in a physical uplink shared channel transmission, the scheduling request information including the information indicating the buffer status as in-band information.

10. The method of claim 9, wherein the scheduling request is needed for transmission of buffered data before a predetermined delay.

11. The method of claim 9, wherein the message is transmitted in a sub-frame as L1 or L2 control information.

12. The method of claim 9 wherein the message is transmitted on a condition that a scheduling grant is insufficient for buffered data.

13. The method of claim 9, wherein status information or quality of service (QoS) requirements of the WTRU are transmitted along with the information indicating the buffer status.

14. The method of claim 9, wherein the WTRU utilizes Long-Term Evolution (LTE) transmissions.

15. The method of claim 9, wherein the scheduling request is prioritized over the information indicating the buffer status.

16. The method of claim 9 further comprising sending, after a predetermined number of sub-frames after transmission of the message, the information indicating the buffer status.

* * * * *